United States Patent [19]

Bridden

[11] Patent Number: 5,207,068
[45] Date of Patent: May 4, 1993

[54] COOLING LIQUIDS

[75] Inventor: Terence E. Bridden, Sheffield, England

[73] Assignee: The BOC Group plc, Windlesham, England

[21] Appl. No.: 596,123

[22] Filed: Oct. 11, 1990

[30] Foreign Application Priority Data

Oct. 16, 1989 [GB] United Kingdom ............... 8923261

[51] Int. Cl.$^5$ .................................................. F25B 19/00
[52] U.S. Cl. ........................................... 62/51.1; 62/70; 62/121
[58] Field of Search ............ 62/68, 69, 70, 51.1, 62/121, 20, 17

[56] References Cited

U.S. PATENT DOCUMENTS

| | | | |
|---|---|---|---|
| 2,732,192 | 1/1956 | Johnson et al. | 62/121 |
| 2,937,506 | 5/1960 | Stirlen | 62/121 |
| 3,094,401 | 6/1963 | Lidell | 62/17 |
| 3,292,380 | 12/1966 | Bucklin | 62/20 |
| 3,672,182 | 6/1972 | Stowasser et al. | 62/70 |
| 4,420,317 | 12/1983 | Stewart | 62/20 |
| 4,551,981 | 12/1985 | Banerjee | 62/70 |

*Primary Examiner*—Ronald C. Capossela
*Attorney, Agent, or Firm*—Carol A. Nemetz; Larry R. Cassett

[57] ABSTRACT

Liquid is cooled in a columnar vessel having an inlet and an outlet for the liquid. The cooling is effected by introducing liquid cryogen into the vessel through a pipe. The liquid cryogen vaporizes and crates turbulence in the liquid in the vessel. Perforated plates dampen the turbulence and disengage the vaporized cryogen from the liquid being cooled. Pressurized gas is introduced from an inlet into the liquid beneath the liquid cryogen. This pressurized gas crates turbulence in the region where the cryogen enters the liquid and thus is able to prevent local freezing of the liquid in the mouth of the pipe. The liquid is typically water and the liquid cryogen typically liquid nitrogen.

13 Claims, 1 Drawing Sheet

COOLING LIQUIDS

TECHNICAL FIELD

This invention relates to cooling liquids, for example, water, aqueous-based dispersions or emulsions, or other non-viscous liquid media.

BACKGROUND OF THE INVENTION

It is known that a liquid such as water can be rapidly cooled by injecting a cryogenic liquid, generally liquid nitrogen into it. The liquid nitrogen extracts heat from the water and vaporises. The cold nitrogen vapour extracts further heat from the water during the period of time in which the two fluids are in contact with one another. The water is thereby further cooled. There are two well known problems that need to be overcome before this method of cooling can be performed to a reasonable level of efficiency. The first problem is to prevent local freezing of the water (or other liquid) from obstructing a nozzle or other device used to introduce the liquid nitrogen into the water. The second problem is to find a means whereby a reasonable proportion of the refrigerative capacity of the liquid nitrogen is extracted therefrom by the time the resulting vaporised nitrogen disengages itself from the water being cooled. This problem is not an easy one to solve since upon injection into the water the liquid nitrogen will tend to vaporise instantaneously with a concomitant large increase in volume. (One volume of liquid nitrogen yields on vaporisation more that 600 volumes of gas.) The so-formed nitrogen vapour thus tends to pass rapidly out of contact with the water with the result that very little time is available to effect heat exchange between the nitrogen vapour and the water. These problems become particularly significant if it is desired to operate the process continuously.

It has been proposed to overcome the first problem, that is blocking of a liquid nitrogen injection nozzle with ice, by either heating the nozzle or passing warm gas through it. This solution, however, provides no help in improving the heat transfer between the water and the liquid nitrogen and makes continuous operation difficult.

It is accordingly an aim of the present to provide a process and apparatus for cooling a liquid by the direct introduction into the liquid of the cryogen (by which is meant a cryogenic liquid) which ameliorates the difficulties discussed above.

SUMMARY OF THE INVENTION

According to the present invention, there is provided apparatus for cooling a liquid comprising a vessel (typically generally columnar) for the liquid having a first inlet for liquid cryogen in a lower region of the vessel whereby in use a violently turbulent mixture of liquid and vaporised cryogen is created, a second inlet for introducing pressurised gas into the liquid beneath the first inlet, whereby in use to create agitation of the liquid where the cryogen enters the liquid, means in an upper region of the vessel for damping the turbulence and disengaging vaporised cryogen from the liquid, and an outlet for the disengaged vaporised cryogen.

The invention also provides a method for cooling a liquid comprising charging a vessel (typically, generally columnar) with the liquid to be cooled, introducing cryogen into the liquid at a lower region of the vessel and thereby creating a violently turbulent mixture of liquid and vaporised cryogen, introducing pressurised gas into the liquid beneath the first inlet whereby to create agitation of the liquid where the cryogen enters the liquid, damping the turbulence and disengaging the vaporised cryogen from the liquid in an upper region of the vessel, and venting disengaged, vaporised, cryogen from the vessel.

The apparatus and method according the invention are preferably operated continuously. Preferably, cooled liquid is withdrawn continuously through an outlet from a level of the vessel intermediate that of the first inlet and that of the said damping and disengaging means. The liquid is preferably introduced continuously into the vessel through a third inlet at a level beneath that of the second inlet. Liquid nitrogen is typically selected as the cryogen since it is widely available at low cost. Alternative cryogens that may be used include liquid argon.

The damping and disengaging means may for example comprise a plurality of vertically spaced, overlapping baffles. It is preferred, however, that the damping and disengaging means comprises a plurality of vertically spaced perforate plates which serve to hinder the upward passage of liquid, such upward passage being created by the turbulence that results from the vaporisation of the cryogen in the liquid, and allows such liquid as does ascend through the perforations to fall back therethrough again under gravity. The first inlet for cryogen preferably has an unrestricted mouth. If desired, a plurality of such inlets may be used. By employing the first inlet with an unobstructed mouth, the apparatus according to the invention is not prone to blockage by any frozen ice.

The second inlet is preferably in the form of a gas distributor which is able to distribute the gas upwardly in the form of fine bubbles from several separate locations. For example, it may take the form of an annular conduit having upwardly facing apertures therein whereby the pressurised gas leaves the inlet in the form of small bubbles which provide agitation in the vicinity of where the cryogen enters the liquid and which thereby facilitate the break-up of the cryogen into relatively small drops, thus increasing the surface of the cryogen available for heat transfer. It is also believed that the pressurised gas helps to de-stabilise any envelope of colder vaporised cryogen which tends to form around each droplet of cryogen in the liquid.

The method and apparatus according to the invention are particularly suited for use in processes in which it is desired to cool the liquid quickly over a temperature range of 50° C. or less. It can nonetheless be used in processes in which cooling over a larger temperature range is required. One example of a process in which the method and apparatus according to the invention may be used is the cooling of water to just above its freezing point. The water may then be employed to make concrete. The method and apparatus according to the invention may also be used in the food industry to cool aqueous products to a suitable "chilled" storage temperature. The method and apparatus according to the invention may also be used to produce a mixture of water and ice (i.e. slush).

BRIEF DESCRIPTION OF THE DRAWING

The method and apparatus according to the invention are now described by way of example with reference to the accompanying drawings.

DESCRIPTION OF THE INVENTION

Figure 1:
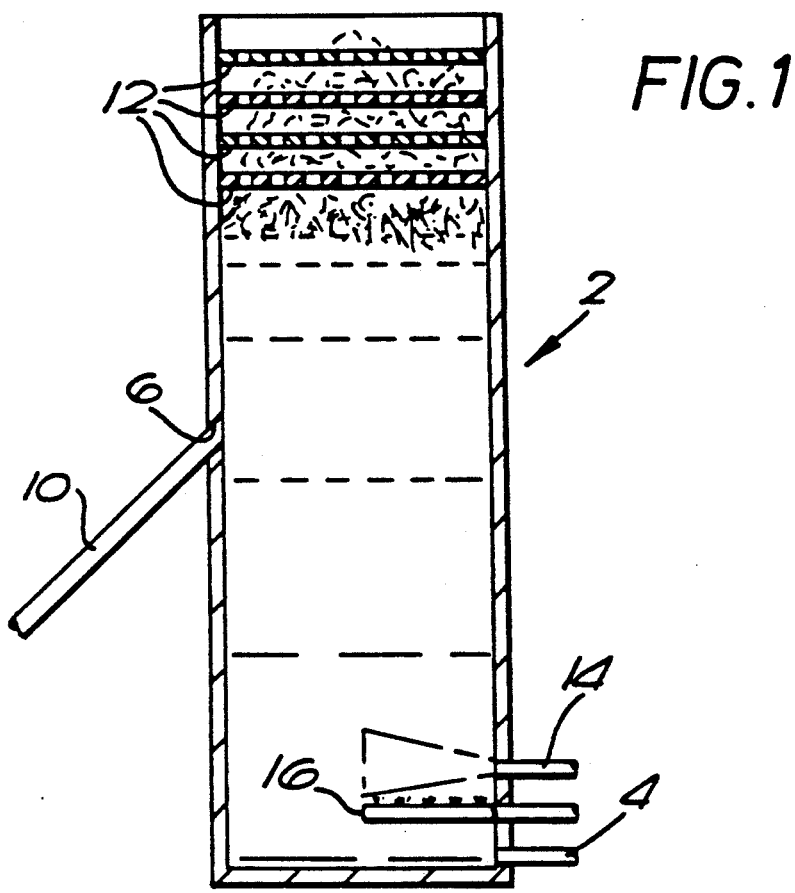
FIG. 1 is a side elevation, partly in section, of a water cooler.
Figure 2:
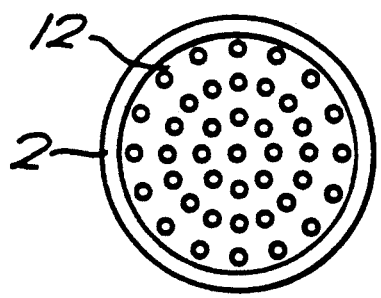
FIG. 2 is a plan view of the water cooler shown in FIG. 1.

The drawings are not to scale.

Referring to the drawings, the illustrated apparatus includes, a generally columnar vessel 2. The vessel 2 has an inlet 4 for water near its bottom and an outlet 6 for chilled water at an intermediate level thereof. The outlet 6 communicates with a downwardly sloping outlet pipe 10 through which the water may be conveyed to the point of use. The vessel 2 is also provided at its upper region with a plurality (preferably at least four) perforate plates 12 which engage the cylindrical wall o the vessel 2 in a fluid tight manner. The vessel 2 is open at its top. In operation of the apparatus, water is preferably fed continuously to the inlet 2 and there is a continuous flow of water out of the outlet 6. In addition, the apparatus is preferably arranged such that in continuous steady state operation none of the plates 12 is submerged in the water to be cooled.

Figure 3:
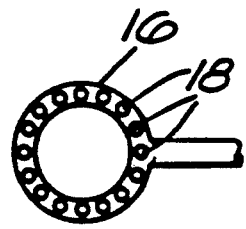
FIG. 3 is a plan view of a pressurised gas injector used in clean water cooler shown in FIG. 1.

The vessel 2 is provided with an inlet 14 for liquid nitrogen. The inlet 14 is connectible to a source of liquid nitrogen (not shown). The inlet 14 is typically in the form of a simple pipe of uniform internal diameter whose outlet or mouth is unrestricted and preferably does not protrude into the interior of the vessel 2. The pipe 14 is preferably horizontally disposed as shown in FIG. 1. Positioned below the level of the inlet 14 but above that of the inlet 4) is an inlet 16 for pressurised gas, typically nitrogen. The inlet 16 takes the form of an annular conduit which has upwardly facing apertures 18 (see FIG. 3) disposed therein and which is connectible to a source of pressurised gas (typically nitrogen) at ambient temperature. (It is not essential that the pressurised gas be at ambient temperature, though it is desirable that it should be at no higher temperature and also desirable that is should be above the freezing point of the water.) The pressurised gas is typically supplied to the inlet 16 at a pressure in the range of 1.5 to 4 atmospheres such that the bubbles of nitrogen that pass from the apertures 18 into the liquid cause agitation in the region where the liquid nitrogen enters the vessel 2 from the inlet 14. In operation, and as shown in FIG. 1, the liquid nitrogen tends to enter the vessel 2 from the inlet 14 as a divergent cone of fluid. The inlet 16 is arranged such that the bubbles of nitrogen that pass into the water through the apertures 18 assist in breaking up the liquid nitrogen cryogen into small droplets which more readily vaporise. The gas introduced through the inlet 16 also has the effect of helping to reduce the tendency for the water to freeze in the immediate vicinity of the mouth of the inlet 14 and of helping to disperse cold nitrogen vapour that tends to surround the liquid nitrogen droplets, thereby facilitating rapid vaporisation of the liquid nitrogen.

It is to be appreciated that it is not necessary to use nitrogen as the source of the pressurised gas which is introduced into the vessel 2 through the inlet 16. Any other convenient source of pressurised gas can be used, for example, air.

Rapid vaporisation of the liquid nitrogen into the water in the vessel 2 causes intense turbulence. As a result the water tends to surge up the columnar vessel 2 to above its natural level and encounters the perforate plates 12. Some liquid is directed downwards from the first plate it encounters while other liquid and vaporised nitrogen bubbles entrained therein pass through the perforations. This phenomenon is repeated at each next higher plate in turn until at the top plate the kinetic energy of the surging liquid has been substantially removed. The liquid which falls back down through the perforations in the plates therebelow. Not only is the turbulence removed from the liquid in this way: the perforated plates also serve to disengage the vaporised nitrogen from the liquid and to provide a longer duration of contact between the vaporised gas and the liquid in the upper region of the vessel 2 than would otherwise take place with the result that the efficiency with which heat is transferred from the liquid to the gas is improved.

The vessel 2 is typically open at its top to allow the free escape of nitrogen after it has passed through the perforate plates 12. Typically, from 40 to 60% of the surface area of each plate is perforate.

The introduction of the liquid nitrogen into the water effects the cooling of the water, and typically its temperature is reduced from say a little above ambient to 1° or 2° C. In an example of the method and apparatus according to the invention, the vessel 2 had a height of above 5.5 meters and a diameter of 0.3 meters; the outlet 6 had a diameter of about 5 centimeters and the inlet 4, a smaller diameter; the inlet 14 had a diameter of 1 centimeter and the apertures 18 in the inlet 16 each had a diameter of about 1.5 millimeters. The position of the outlet 6 was about 2 meters from the bottom of the vessel 2. In an experiment performed with this apparatus, 131 kg of water was cooled by 7° C. using 11.9 kg of liquid nitrogen and about 2.9 cubic meters of gaseous nitrogen. (An approximate ratio of 1 volume of gaseous nitrogen to 3 volumes of liquid nitrogen.) The time taken to effect this cooling was half an hour.

I claim:

1. Apparatus for cooling a liquid comprising a vessel for the liquid with means for liquid entry and exit having a first inlet for liquid cryogen in a lower region of the vessel whereby in use a violently turbulent mixture of liquid and vaporised cryogen is created, a second inlet for introducing pressurised gas into the liquid beneath the first inlet, whereby in use to create agitation of the liquid where the cryogen enters the liquid, means in an upper region of the vessel for damping the turbulence and disengaging vaporised cryogen from the liquid, and an outlet for the disengaged vaporised cryogen.

2. Apparatus as claimed in claim 1, wherein the vessel additionally includes an outlet at a level intermediate that of the first inlet and that of the said damping and disengaging means, and a third inlet for liquid beneath the second inlet, whereby the apparatus is able to be operated continuously.

3. Apparatus as claimed in claim 1, wherein the damping and disengaging means comprises a plurality of spaced, overlapping baffles.

4. Apparatus as claimed in claim 1, wherein the damping and disengaging means comprises a plurality of vertically spaced perforate plates.

5. Apparatus as claimed in claim 1, in which the first inlet has an unrestricted mouth.

6. Apparatus as claimed in claim 1, wherein the second inlet is in the form of a gas distributor able to distribute the gas upwardly in the form of fine bubbles from several separate locations.

7. Apparatus as claimed in claim 6, wherein the distributor takes the form of an annular conduit having upwardly facing apertures therein whereby in use, the pressurised gas leaves the inlet in the form of small bubbles which provide agitation in the vicinity of where the cryogen enters the liquid and which thereby facilitate the break-up of the cryogen into drops.

8. Apparatus as claimed in claim 1, in which the vessel is generally columnar.

9. A method for cooling a liquid comprising charging a vessel with the liquid to be cooled, introducing liquid cryogen into the liquid at a lower region of the vessel and thereby creating a violently turbulent mixture of liquid and vaporised cryogen, introducing pressurised gas into the liquid beneath the first inlet whereby to create agitation of the liquid where the cryogen enters the liquid, damping the turbulence and disengaging the vaporised cryogen from the liquid in an upper region of the vessel and venting disengaged, vaporised, cryogen from the vessel.

10. A method as claimed in claim 9, additionally including continuously introducing liquid to be cooled into the vessel and continuously withdrawing cooled liquid therefrom.

11. A method as claimed in claim 9, in which the liquid cryogen is liquid nitrogen.

12. A method as claimed in claim 9, in which the liquid is reduced in temperature by 50° C. or less.

13. A method as claimed in claim 9, in which the liquid is water.

* * * * *